LOW BIREFRINGENT ORTHOFERRITES
Filed Dec. 13, 1971
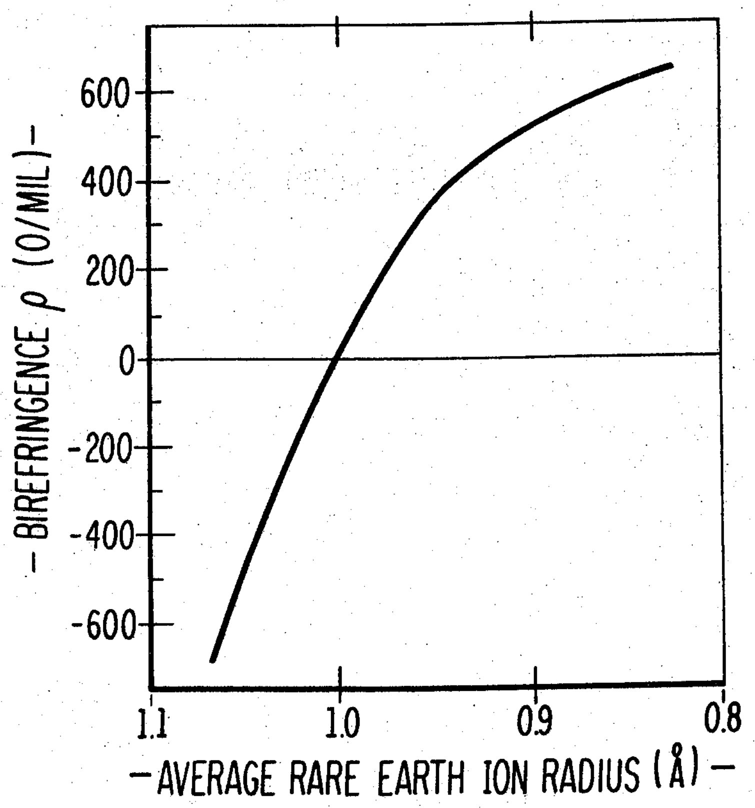

United States Patent Office 3,804,766
Patented Apr. 16, 1974

3,804,766
LOW BIREFRINGENT ORTHOFERRITES
Richmond Bennett Clover, Jr., Hightstown, N.J., assignor to RCA Corporation
Filed Dec. 13, 1971, Ser. No. 207,274
Int. Cl. C04b *35/40*
U.S. Cl. 252—62.57 4 Claims

ABSTRACT OF THE DISCLOSURE

Orthoferrites having low optical birefringence have the molar formula $M_xE_{1-x}FeO_3$, wherein M is a lanthanide of the type having a positive contribution to the optical birefringence of the orthoferrite and E is a lanthanide having a negative contribution to the optical birefringence of the orthoferrite, the proportion of E to M being such that said crystal has a low net non-magnetic optical birefringence. Examples of such orthoferrites include $Sm_xPr_{1-x}FeO_3$ $Sm_xLa_{1-x}FeO_3$ and $Nd_xPr_{1-x}FeO_3$, the value of $x$ being approximately 0.4, 0.7 and 0.8, respectively, for a near zero birefringence at a wavelength of 0.633 micron.

BACKGROUND OF THE INVENTION

This invention relates to magnetic materials, more specifically, to rare earth orthoferrites having a low optical birefringence. Rare earth orthoferrites are uniaxial ferrimagnets which support cylindrical bubble domains. Bubble domains represent information storage in memory and logic devices. Such devices are described by A. H. Bobeck, et al. in IEEE Transactions on Magnetics, vol. MAG–5, No. 3, September 1969.

Bubble domains in a thin single crystal orthoferrite platelet may be manipulated by application of magnetic field gradients generated by appropriate circuitry. Bubble domain memory devices requires a method of bubble creation and annihilation, bubble propagation and bubble detection. Bubble domains can be detected magnetically using Hall effect and magnetorestrictive devices. In addition, optical detection can be accomplished by using the longitudinal Faraday rotation of light propagated through a bubble domain-containing platelet. This is discussed in an article by W. J. Tabor et al., Journal of Applied Physics, vol. 40, pages 2760–2769. Since orthoferrites have orthorhombic crystal symmetry, the presence of optical birefringence in these crystals is expected. Optical birefringence, however, reduces the effective maximum Faraday rotation which can be obtained in the orthoferrite crystal platelet. Consequently, in order to obtain the same signal and signal-to-noise ratio values in crystals having high optical birefringence, an optical detection system employing a higher intensity light source or a more sensitive detector is required as compared to what would be required if the orthoferrites had a low optical birefringence.

Orthoferrites previously investigated show substantial birefringence. (See W. J. Tabor et al., Journal of Applied Physics, volume 41, page 3018, 1970.) We have discovered that orthoferrites can be prepared which have arbitrarily small optical birefringence. These low birefringent orthoferrites are also useful in such devices as binary optical shutters in visual displays or memory arrays, as well as bubble domain devices.

SUMMARY OF THE INVENTION

An orthoferrite crystal is represented by the molar formula $M_xE_{1-x}FeO_3$ wherein M is at least one lanthanide selected from the group consisting of lanthanides which contribute to a positive optical birefringence, and E is at least one lanthanide selected from the group consisting of lanthanides contributing to a negative optical birefringence, the proportion of E to M being such that said crystal has a low net non-magnetic optical birefringence at a desired wavelength.

BRIEF DESCRIPTION OF THE DRAWINGS

The figure is a graphical representation of the birefringence of rare earth orthoferrites as a function of the average rare earth ion radius.

DETAILED DESCRIPTION OF THE INVENTION

A single crystal (001) orthoferrite platelet with both magnetization and incident light normal to the (001) plane of the platelet has an intrinsic Faraday rotation, $\theta$, and an intrinsic birefringence per unit thickness, $\rho$. For these orthorhombic crystals there is no obvious symmetry condition which would require the birefringence to go to zero since the atomic distance can be different for each of the crystallographic directions. In fact, one might have expected the birefringence to be smallest in $LaFeO_3$ since the difference in lattice parameters, $b—a$, is smallest for this ortroferrite and $LaFeO_3$ is also the least distorted from cubic of all of the orthoferrites. This, however, is not the case.

We have discovered that compositions consisting of mixed rare earth orthoferrites can be pepared to have an arbitrarily small birefringence approaching and including zero for any particular wavelength of light. The particular composition necessary to obtain this very low value of birefringence is different from wavelength to wavelength.

In general, the novel low birefringent orthoferrites comprises a mixture of rare earth ions wherein at least one rare earth ion contributes to a negative value or direction of birefringence (i.e., $n_b—n_a$ is negative, wherein $n_b$ and $n_a$ are the indices of refraction along the crystallographic axes $b$ and $a$, respectively), and at least one other rare earth ion contributes to a positive value of birefringence (i.e., $n_b—n_a$ is positive) so that the net optical birefringence of the orthoferrite is low for the particular wavelength of light to be employed. Examples of rare earth ions which contribute to a negative value of birefringence at wavelengths in the visible and infra red regions are La and Pr. Examples of rare earth ions which contribute to a positive value of birefringence at these same wavelengths are those rare earth ions having an atomic number from 60 through 71, i.e., all those rare earth's in the series from neodymium through lutetium. The novel rare earth orthoferrites may be represented by the formula $M_xE_{1-x}FeO_3$, wherein M is a lanthanide which contributes to a positive value of the birefringence, and wherein E is a lanthanide which contributes to a negative value of the birefringence. It should be understood that either M or E or both can be more than one ion in the respective group.

Referring to the figure, the birefringence, $\rho$ of orthoferrites at a wavelength of 0.633 micron, obtained from a helium-neon laser, is shown as a function of the average radius of the rare earth ions present. The ionic radii of each ion was obtained from "Spectra & Energy Levels of Rare Earth Ions in Crystals" by G. H. Dieke, Interscience Publishers, 1968 at page 16. The birefringence is given in degrees per mil. $LaFeO_3$ and $PrFeO_3$ have a negative birefringence, the birefringence of $LaFeO_3$ being substantially more negative than the birefringence of the $PrFeO_3$. The conclusion, therefore, is that La and Pr ions contribute to a negative birefringence. It can also be seen from the curve that other rare earth orthoferrites such as Nd, Eu and Lu orthoferrites have positive values of birefringence. The conclusion, therefore, is that Nd and the other rare earth ions having an ionic radius less than that of Nd contribute to a positive value of birefringence. The figure also shows that the birefringence of mixed rare earth orthoferrites containing an ion which contributes to a positive birefringence together with an ion which contributes to a negative birefringence, will exhibit a birefringence between that of the orthoferrites of the individual ions. In fact, there is shown to exist a composition which has net birefringence of about zero, within experimental error. Experimental error is typically ±10°/mil for low values of $\rho$ and ±10% at high value of $\rho$. Experimental error for $\theta$ is typically ±2°/mil. The example of the orthoferrite shown in the figure to have a net birefringence of about zero is $Nd_{0.8}Pr_{0.2}FeO_3$. Typically, for light of 0.633 micron, an average ionic radius (using Dieke's values) of the rare earths should be about 1.0 in order to obtain low optical birefringence.

On the table shown below, the birefringence, $\rho$, in degrees per mil and the Faraday rotation, $\theta$, in degrees per mil are shown for various rare earth orthoferrites with incident radiation of 0.633 micron and 1.15 microns.

TABLE 1

| | 0.633 microns | | 1.15 microns | |
|---|---|---|---|---|
| | $\rho$°/mil | Θ°/mil (±2) | $\rho$°/mil | Θ°/mil |
| $LaFeO_3$ | −600 | 15 | −200 | 1.4 |
| $Sm_{0.7}La_{0.3}FeO_3$ | (±*) ~30 | 13 | | |
| $SmFeO_3$ | +275 | | | |
| $Sm_{0.5}Pr_{0.5}FeO_3$ | +90 | 12 | | |
| $Sm_{0.4}Pr_{0.6}FeO_3$ | (±*) ~15 | 15 | | |
| $Sm_{0.35}Pr_{0.65}FeO_3$ | −20 | 13 | | |
| $PrFeO_3$ | −77 | 10 | −61 | 2.4 |
| $Nd_{0.5}Pr_{0.5}FeO_3$ | −65 | 11 | −55 | 2.8 |
| $Nd_{0.8}Pr_{0.2}FeO_3$ | (±*) ~10 | 14 | +31 | 2.3 |
| $NdFeO_3$ | +40 | 12 | −43 | 1.7 |

*Sign uncertain.

It can be seen from the table that the optical birefringence for a given composition depends upon the wavelength of incident light at which it is measured. The Faraday rotation is also dependent upon the wavelength of the incident light. Since the highest optical contrast for rare earth orthoferrites when using a helium-neon laser light source is obtainable at the 0.633 micron wavelength, this is the wavelength for which the optical birefringence was minimized. It can be seen that approximately zero optical birefringence at 0.633 micron (within experimental error) is achieved in $Sm_{0.7}La_{.3}FeO_3$, $Sm_{0.4}Pr_{0.6}FeO_3$, and $Nd_{0.8}Pr_{0.2}FeO_3$. Since La ions have a significantly greater negative birefringence contribution as compared to Pr ions, much less La than Pr is required to counterbalance the positive birefringence of, for example, Sm in order to obtain a zero birefringence for the samarium-containing orthoferrites.

The optimum thickness for greatest efficiency of a novel crystal platelet used as a memory element is a function of the Faraday rotation, $\theta$, and the absorption coefficient, $\alpha$, of the crystal. It can be determined from the following formula $$\text{Optimum thickness} = \frac{1}{2\theta} \tan^{-1} \frac{4\theta}{\alpha}$$

Also, generally, the thinner the platelet, the greater the amount of birefringence that is tolerable to obtain an efficiency within 3 db of maximum. Typically, the optimum platelet thickness is about 1–2 mils. In this thickness range $\rho/\theta$ may be as much as 5/1 without a greater than 3 db loss of efficiency. Efficiency is defined as the ratio of the intensity of light transmitted through the crystal between crossed polarizers (i.e., detectable light) to the intensity of the light entering the crystal.

What is claimed is:

1. An orthoferrite crystal having the molar formula $Sm_xPr_{1-x}FeO_3$, wherein $x$ is between 0.3 and 0.5.

2. An orthoferrite crystal having the molar formula $Sm_{0.7}La_{0.3}FeO_3$.

3. An orthoferrite crystal having the molar formula $Nd_{0.8}Pr_{0.2}FeO_3$.

4. An orthoferrite crystal having the molar formula $Sm_{0.4}Pr_{0.6}FeO_3$.

References Cited

UNITED STATES PATENTS 3,689,415 9/1972 Remeika ........ 252—62.57 X
3,647,538 3/1972 Wolfe ........... 252—62.57 X

OTHER REFERENCES

Belov et al.: "Chemical Abstracts," vol. 61, p. 12779c (1964).

OSCAR R. VERTIZ, Primary Examiner

J. COOPER, Assistant Examiner

U.S. Cl. X.R.

423—263, 594